(12) United States Patent
Gao et al.

(10) Patent No.: US 9,776,913 B2
(45) Date of Patent: Oct. 3, 2017

(54) METHODS AND APPARATUS PROVIDING A SUBSTRATE HAVING A COATING WITH AN ELASTIC MODULUS GRADIENT

(71) Applicant: CORNING INCORPORATED, Corning, NY (US)

(72) Inventors: Zhanjun Gao, Rochester, NY (US); Guangli Hu, Horseheads, NY (US); Ralph Edward Truitt, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 63 days.

(21) Appl. No.: 14/445,323

(22) Filed: Jul. 29, 2014

(65) Prior Publication Data

US 2015/0037554 A1 Feb. 5, 2015

Related U.S. Application Data

(60) Provisional application No. 61/861,121, filed on Aug. 1, 2013.

(51) Int. Cl.
*B32B 7/00* (2006.01)
*C03C 17/22* (2006.01)
*C03C 17/23* (2006.01)

(52) U.S. Cl.
CPC ............ *C03C 17/22* (2013.01); *C03C 17/225* (2013.01); *C03C 17/23* (2013.01);
(Continued)

(58) Field of Classification Search
None
See application file for complete search history.

(56) References Cited

U.S. PATENT DOCUMENTS

| 763,591 A | 6/1904 | Brown |
| 5,562,774 A | 10/1996 | Breidenbach et al. ....... 118/715 |

(Continued)

FOREIGN PATENT DOCUMENTS

| CN | 1676551 A | 10/2005 | ............... C09D 1/02 |
| CN | 102011093 A | 4/2011 | ............. C23C 14/06 |
| DE | 4429825 C1 | 11/1995 | ........... H01L 21/205 |

OTHER PUBLICATIONS

S. Suresh, "Graded Materials for Resistance to Contact Deformation and Damage", *Science*, vol. 292, No. 5526, Jun. 29, 2001, pp. 2447-2451.

(Continued)

*Primary Examiner* — David Sample
*Assistant Examiner* — Nicole T Gugliotta
(74) *Attorney, Agent, or Firm* — Payal A. Patel; Jeffrey A. Schmidt (57) ABSTRACT

Methods and apparatus are provide for: a substrate having first and second opposing surfaces, and an elastic modulus; and layer(s) having a thickness between first and second opposing surfaces thereof, the first surface of the layer contacting the second surface of the substrate, forming an interface. The layer may exhibit one or more of: a first elastic modulus proximate to the first surface thereof and a second elastic modulus proximate to the second surface thereof, the second elastic modulus being substantially higher than the elastic modulus value, the first elastic modulus being lower than the elastic modulus of the substrate, the second elastic modulus being higher than the elastic modulus of the substrate, and the layer exhibiting an increasing elastic modulus gradient through the thickness thereof from the first elastic modulus to the second elastic modulus.

18 Claims, 5 Drawing Sheets

(52) U.S. Cl.
CPC .... *C03C 2217/231* (2013.01); *C03C 2217/91* (2013.01); *C03C 2217/948* (2013.01); *Y10T 428/24983* (2015.01)

(56) References Cited

U.S. PATENT DOCUMENTS

| | | | | |
|---|---|---|---|---|
| 6,641,893 | B1 | 11/2003 | Suresch et al. | 428/105 |
| 2011/0192451 | A1* | 8/2011 | Sato | B23K 20/04 |
| | | | | 136/252 |
| 2012/0028012 | A1 | 2/2012 | Nicholls et al. | 428/213 |
| 2014/0090864 | A1 | 4/2014 | Paulson | 174/50 |
| 2014/0093711 | A1 | 4/2014 | Paulson | 428/217 |
| 2014/0106150 | A1* | 4/2014 | Decker | C03C 17/34 |
| | | | | 428/216 |
| 2014/0131091 | A1 | 5/2014 | Smith | 174/432 |
| 2014/0255616 | A1 | 9/2014 | Paulson | |
| 2014/0362444 | A1 | 12/2014 | Paulson | |

OTHER PUBLICATIONS

Y. Zhang, et al., "Designing functionally graded materials with superior load-bearing properties", *ACTA Biomaterialia*, vol. 8, No. 3, Mar. 1, 2013, pp. 1101-1108.

PCT Appln. No. PCT/US2014/048554, filed Jul. 29, 2014, PCT Search Report dated Nov. 6, 2014.

Chi, Shyang-ho. "Cracking in coating—substrate composites with multi-layered and FGM coatings." Engineering Fracture Mechanics 70 (2003) 1227-1243.

Mixed mode cracking in layered materials, JW Hutchinson, Z Suo, Advances in applied mechanics 29 (63), 191.

Atomic Layer Deposition: An Overview, Steven M. George, Chem. Rev. 2010, 110, 111-131.

Beuth; "Cracking of Thin Bonded Films in Residual Tension"; Int J. Solid Structures, 29, No. 13, (1992), p. 1657-1675.

Zeng et al. "Investigation of mechanical properties of transparent conducting oxide thin films" Thin Solid Films 443 (2003) pp. 60-65.

\* cited by examiner

METHODS AND APPARATUS PROVIDING A SUBSTRATE HAVING A COATING WITH AN ELASTIC MODULUS GRADIENT

CROSS-REFERENCE TO RELATED APPLICATIONS

This application claims the benefit of priority under 35 U.S.C. §119 of U.S. Provisional Application Ser. No. 61/861,121 filed on Aug. 1, 2013, the content of which is relied upon and incorporated herein by reference in its entirety.

BACKGROUND

The present disclosure relates to methods and apparatus for achieving a functional coating on a substrate, where the coating exhibits an elastic modulus gradient through a thickness thereof.

Many consumer and commercial products employ a sheet of high-quality cover glass to, for example, protect critical devices within the product, provide a user interface for input and/or display, and/or many other functions. For example, mobile devices, such as smart phones, mp3 players, computer tablets, etc., often employ one or more sheets of high strength glass on the product to both protect the product and achieve the aforementioned user interface. In such applications, as well as others, the glass may be durable (e.g., scratch resistant and fracture resistant), transparent, and/or antireflective. Indeed, in a smart phone and/or tablet application, the cover glass is often the primary interface for user input and display, which means that the cover glass would exhibit high durability and high optical performance characteristics.

Among the evidence that the cover glass on a product may manifest exposure to harsh operating conditions, scratches are probably the most common. Such evidence suggests that sharp contact, single-event damage is the primary source of visible scratches on cover glass in mobile products. Once a significant scratch mars the cover glass of a user input/display element, the appearance of the product is degraded and the resultant increase in light scattering may cause significant reduction in brightness, clarity and contrast of images on the display. Significant scratches can also affect the accuracy and reliability of touch sensitive displays. As a single severe scratch, and/or a number of moderate scratches, are both unsightly and can significantly affect product performance, they are often the leading complaint of customers, especially for mobile devices such as smart phones and/or tablets.

Accordingly, there are needs in the art for new methods and apparatus for achieving functional coatings on substrates, especially glass substrates.

SUMMARY

It may be advantageous to impart any number of functional properties to a substrate, such as a glass substrate by applying a coating to the substrate. The coating forms a layer(s) on the substrate and such a substrate may be referred to herein as a coated substrate. Although the advantageous functional properties achieved by adding a layer to a substrate are numerous, one such functional property is scratch resistance. In general, harder surfaces exhibit better scratch resistance as compared with softer surfaces (i.e., surfaces with reduced hardness). However, a given substrate composition employed to achieve certain strength and optical characteristics for a particular application may not exhibit a desired level of hardness, and therefore a desired level of scratch resistance.

For example, an oxide glass, such as Gorilla® Glass, which is available from Corning Incorporated, has been widely used in consumer electronics products. Such glass is used in applications where the strength of conventional glass is insufficient to achieve desired performance levels. Strengthened glass, such as Gorilla® Glass, is manufactured by chemical strengthening (e.g., via an ion exchange process) in order to achieve high levels of strength while maintaining desirable optical characteristics (such as high transmission, low reflectivity, and suitable refractive index). Strengthened glass through ion exchange (IX) techniques can produce high levels of compressive stress in the treated glass, for example, as high as about 400 to 1000 MPa at the surface. In addition, the ion-exchange depth of layer (or the depth within the glass at which the ion exchange occurs) may be in the range of about 15-100 microns. Where scratch resistance is imparted, a desirable combination of hardness and elastic modulus for Gorilla® Glass for applications in which scratch resistance is of concern is on the order of about 15 GPa and higher hardness and/or about 80 GPa or higher elastic modulus.

For purposes herein, the term "hardness" is intended to refer to the Berkovich hardness test, which is measured in GPa and employs a nano-indenter tip used for testing the indentation hardness of a material. Also, for purposes herein, the phrase "elastic modulus" is intended to refer to the Young's Modulus, which may also be measured in GPa.

One approach to imparting one or more functional properties to a given substrate, whether glass or otherwise, is to apply a coating to the substrate to produce a composite structure that exhibits such one or more functional properties. Where scratch resistance is desired, the substrate may be combined with a layer having a requisite hardness. For example, assuming that cost is not a factor, a diamond-like carbon coating may be applied to a substrate to improve hardness characteristics of the composite structure. Indeed, diamond exhibits a hardness of 100 GPa. While the addition of a coating atop a substrate may overcome inherent limitations of a given substrate material, the coating may degrade other characteristics of the substrate, such as the fracture strength of the substrate and/or optical characteristics thereof.

Through proper consideration of certain parameters of the elastic modulus of the coating, a very satisfactory outer surface having one or more desired functional properties may be achieved without significantly diminishing the fracture strength of the glass substrate. For example, one or more aspects may involve providing a scratch resistant coating having a requisite hardness on a substrate, where the coating exhibits an elastic modulus gradient (i.e., wherein the coating has an elastic property that varies through the thickness of the coating). In such aspects, the coating imparts the desired functional property (i.e., scratch resistance) without degrading the strength of the underlying substrate. In general, an outer surface of the coating has a higher elastic modulus than the glass substrate. The elastic modulus of the coating reduces from the level at the outer surface through the thickness of the coating to a value at the interface that is lower than that of the substrate. In this way, the outer portion (including the outer surface) of the coating is stiff (i.e., exhibits high elastic modulus), while the low elastic modulus at the interface inhibits any driving forces from causing cracks to penetrate into the substrate from the coating. Therefore, the fracture strength of the substrate is maintained whilst simultaneously improving the scratch resistance thereof. Likewise, where other functional properties are desired, a coating exhibiting such functional properties may be applied and may have an elastic modulus gradient as described above.

As discussed above, the functional property of scratch resistance may be imparted to a substrate by applying a hard coating on the substrate. Similarly, a coating having other attributes may be applied to the substrate to impart other function properties, as described herein. For example, other functional properties may be imparted to a substrate by coating same with a layer of indium-tin-oxide ("ITO") or another transparent conductive oxide (e.g., aluminum and gallium doped zinc oxides, fluorine doped tin oxide, etc.) layers. For example, a conductive oxide layer may be useful in producing touch screen displays. Still further functional properties may be imparted to a substrate by applying a coating of other materials to dispose IR or UV reflecting layers, conducting or semiconducting layers, electronics layers, thin-film-transistor layers, or anti-reflection ("AR") layers (e.g., $SiO_2$ and $TiO_2$ layered structures) on the substrate.

Other aspects, features, and advantages will be apparent to one skilled in the art from the description herein taken in conjunction with the accompanying drawings.

DESCRIPTION OF THE DRAWINGS

For the purposes of illustration, one or more embodiments are shown in the drawings, it being understood, however, that the embodiments disclosed and described herein are not limited to the precise arrangements and instrumentalities shown.

DETAILED DESCRIPTION

Various embodiments disclosed herein are directed to improving one or more functional properties (e.g., scratch resistance and/or other durability characteristics, such as hardness, etc.) of a substrate, such as a glass substrate, by applying one or more coatings onto the substrate. In order to provide a fuller understanding of how the discoveries herein were achieved, and therefore the broad scope of the contemplated embodiments, a discussion of certain experimentation and/or theory will be provided. It is noted, however, that the embodiments herein are not necessarily limited to any such experimentation and/or theory.

General Structure and Considerations

Figure 1:
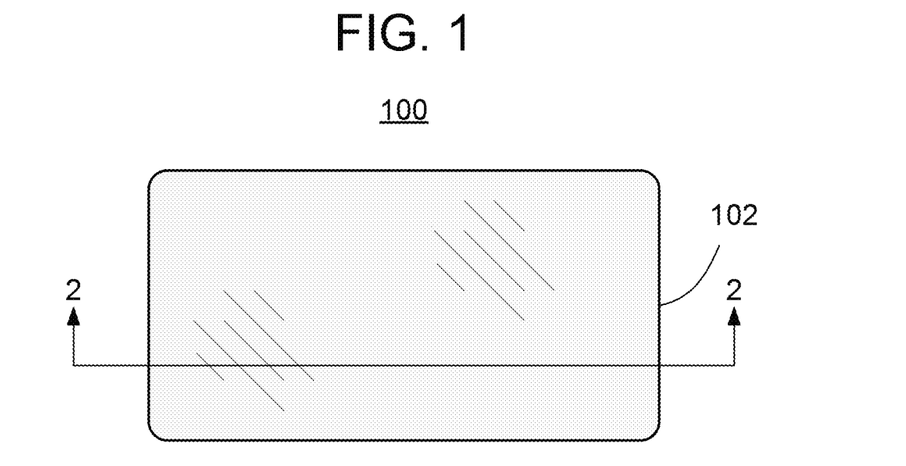
FIG. 1 is a schematic view of a glass substrate coated with a layer of material.

With reference to FIG. 1, a structure 100 may include a substrate 102 of interest in connection with the development of novel processes and structures to improve the mechanical properties of the substrate 102. For example, the substrate 102 material may be glass, strengthened glass, such as, specifically Gorilla® Glass from Corning Incorporated, which is an ion-exchange glass, usually an alkali aluminosilicate glass or alkali aluminoborosilicate glass. Those skilled in the art will appreciate that the specific substrate material is not limited to glass, strengthened glass or Gorilla® Glass in particular, however, such material was selected for experimentation and example. A bare substrate 102 of Gorilla® Glass may exhibit an elastic modulus of about 70 GPa and a hardness of about 7 GPa. A desirable characteristic for scratch resistance (and/or other applications) is on the order of at least about 80 GPa elastic modulus and/or at least about 13 GPa hardness.

As mentioned above, the addition of a hard coating on the substrate 102 may improve the scratch resistance of the structure 100; however, the coating also may reduce the fracture strength of the substrate 102. A reason for the reduction in fracture strength is attributable to differences in certain mechanical properties of the coating versus certain mechanical properties of the substrate 102. For example, under load, a hard, brittle coating (such as indium tin oxide (ITO)) can develop through-coating-cracks, such as when the coating bends during a ring-on-ring fracture test of the structure 100. These cracks develop before any flaws in the glass substrate 102 begin to develop into cracks. As the load continues to increase, the brittle nature of the coating results in the release of stored energy at an energy release rate that is a function of the mechanical properties of the coating material and the mechanical properties of the substrate 102 material.

Figure 2:
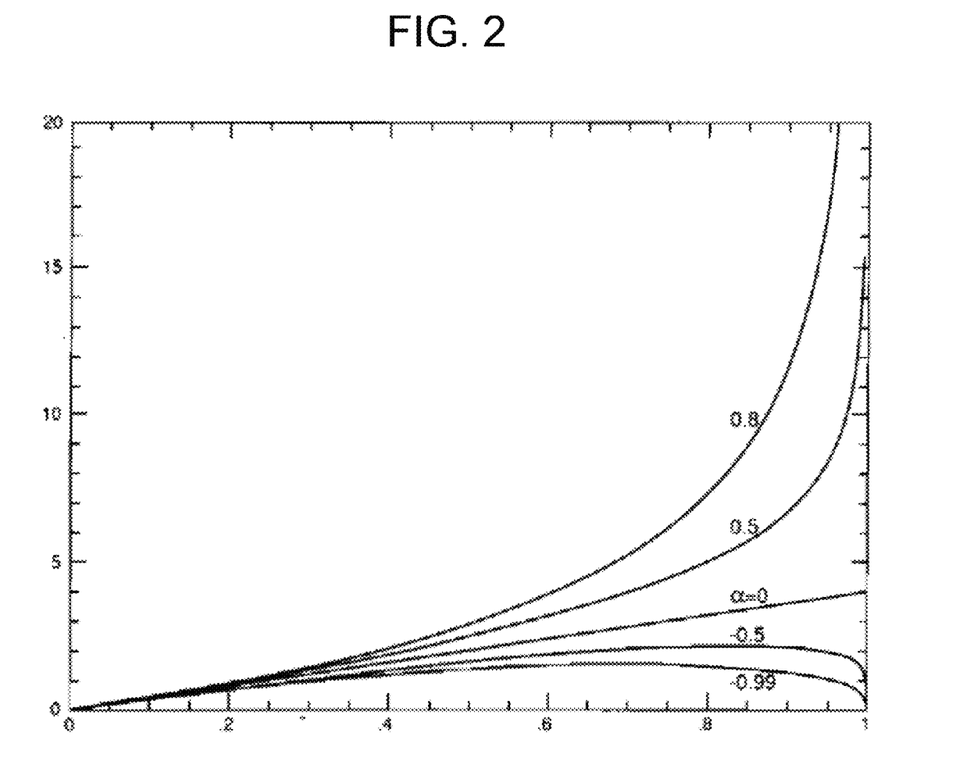
FIG. 2 is a graph illustrating a number of plots of normalized energy release rate as a function of normalized crack depth for respective coated substrates.

FIG. 2 is a graph illustrating a number of plots, each representing the normalized energy release rate according to a particular difference between the elastic moduli of the coating and the elastic modulus of the substrate 102 for respective structures 100. Such effects have been considered in the literature, for example, see, Beuth, J. (1992). Cracking of thin bonded films in residual tension. Int J. Solid Structures, 29, No. 13, P1657-1675. The ordinate (Y-axis) of the plot is the normalized energy release rate, while the abscissa (X-axis) of the plot is the normalized crack depth in the coating. The numeric label (alpha) of each plot may be expressed as follows:

$$alpha=(E1-E2)/(E1+E2),$$

where $Ei=E/(1-vi^2)$, $i=1$ denotes the properties of the coating, $i=2$ denotes the properties of the substrate 102, E is the Young's Modulus, and vi is the Poisson's Ratio.

With reference to the plots of FIG. 2, when alpha is equal to zero there is no mismatch because the coating and the substrate 102 have the same Young's modulus and Poisson's ratio. Consequently, there is a relatively low energy release rate as a crack approaches the interface of the coating and the substrate 102 (i.e., where the abscissa is equal to 1). When alpha is less than zero, there is a mismatch because the Young's modulus of the coating is less than the Young's modulus of the substrate 102. Consequently, there is an even lower energy release rate as a crack approaches the interface of the coating and the substrate 102. Finally, when alpha is larger than zero, there is also a mismatch because the Young's modulus of the coating is higher than the Young's modulus of the substrate 102. Consequently, there is a marked increase in the energy release rate as a crack approaches the interface of the coating and the substrate 102. Indeed, the higher the mismatch in Young's moduli of the substrate 102 and coatings with higher Young's modulus than the substrate 102, respectively, the higher the energy release rate will be at the interface and the more prevalent the propagation of cracks will be from the coating into the substrate 102. On the other hand, the higher the mismatch in Young's moduli of the substrate and coatings with higher Young's modulus than the substrate 102, respectively, the lower the energy release rate will be at the interface and the less prevalent the propagation of cracks will be from the coating into the substrate 102. Indeed, under such circumstances a crack in the coating tends to be interrupted at the interface and no propagation into the substrate 102 occurs.

Desirable Characteristics—Gradient

Figure 3:
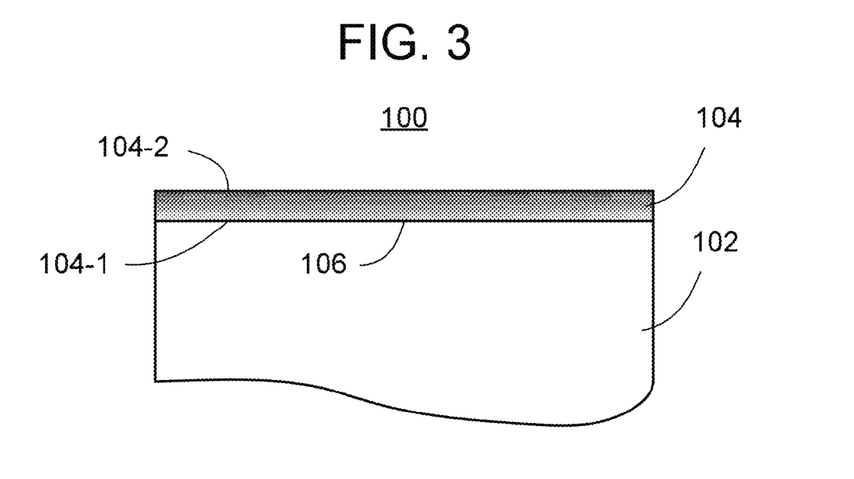
FIG. 3 is a schematic, side view of the coated glass substrate of FIG. 1 taken through cross-sectional line 2-2.

With reference to FIG. 3, one or more embodiments herein provide for a structure 100 having a substrate 102 and a layer 104 disposed on the substrate 102. In a broad aspect, the structure 100 includes the substrate 102 having first surface (not shown) and second, opposing surface 106, and at least one layer 104 substantially covering the substrate 102. It is noted that the phrase "substantially covering" herein means that the superior layer (i.e., the layer 104) overlies the inferior layer (i.e., the substrate 102) either directly or indirectly through one or more intermediate layers. In one or more embodiments, the layer 104 may be disposed on either or both sides of the substrate 102. In the embodiment illustrated in FIG. 3, there are no intermediate layers shown between, for example, the layer 104 and the substrate 102, although such intermediate layers are contemplated. In a specific embodiment, the at least one layer 104 has a thickness between a first surface 104-1 and an opposing second surface 104-2 thereof, where the first surface 104-1 of the layer 104 contacts the second surface 106 of the substrate thereby forming an interface.

In one or more embodiments, the layer 104 is a protective layer exhibiting scratch resistant characteristics. In one or more alternative embodiments, the layer 104 may provide additional and/or alternative functional properties, as otherwise described herein. In this regard, the substrate 102 has a particular elastic modulus, while the layer 104 exhibits differing elastic modulus properties. For example, the layer 104 may exhibit an elastic modulus gradient through a thickness thereof, such that a variation in the elastic modulus exists from the first surface 104-1 to the opposing second surface 104-2.

The elastic modulus gradient (illustrated as varying shades of grey in the layer 104 of FIG. 3) may be characterized in any number of ways. For example, the layer 104 may exhibit a first elastic modulus proximate to the first surface 104-1 thereof and a second elastic modulus proximate to the second surface 104-2 thereof, where the second elastic modulus is substantially higher than the first elastic modulus. Thus, the layer 104 may exhibit an increasing elastic modulus gradient through the thickness thereof from the first elastic modulus (at or near the first surface 104-1) to the second elastic modulus (at or near the second surface 104-2). Notably, another aspect is characterized by the first elastic modulus being lower than the elastic modulus of the substrate 102, while the second elastic modulus is higher than the elastic modulus of the substrate 102. Thus, while the second surface 104-2 (the top surface in FIG. 3) of the layer 104 provides a stiffer (i.e., higher elastic modulus), the decreasing elastic modulus to the interface 106, specifically to a level that is at least slightly lower than that of the substrate 102, tends to interrupt any cracks propagating through the coating from transferring energy (through an energy release) to the substrate 102 and further formation of cracks therein.

The other functional property or properties of the layer 104 may be dependent or independent on the elastic modulus gradient. For example, for some materials, the hardness of the layer 104 may vary with the varying elastic modulus. In other instances, the hardness may be constant or may vary differently from the varying elastic modulus.

While the above discussion has been in terms of an elastic modulus gradient through the layer 104, skilled artisans will appreciate that the gradient may additionally or alternatively be made with respect to a hardness gradient through the layer 104, with corresponding comparisons to a hardness of the substrate 102. Indeed, skilled artisans will appreciate that at least some of the references to elastic modulus made herein (infra and/or supra) may be made with respect to hardness with equal validity. For example, the layer 104 may exhibit a first hardness proximate to the first surface 104-1 thereof and a second hardness proximate to the second surface 104-2 thereof, where the second hardness is substantially higher than the first hardness. Thus, the layer 104 may exhibit an increasing hardness gradient through the thickness thereof from the first hardness (at or near the first surface 104-1) to the second hardness (at or near the second surface 104-2). In keeping with the specific aspect discussed above, the first hardness is lower or significantly lower than the hardness of the substrate 102, while the second hardness is higher than the hardness of the substrate 102.

In accordance with one or more further aspects, the elastic modulus gradient may be additionally or alternatively characterized in that the gradient of the layer 104 increases monotonically (or at least substantially monotonically) through the thickness thereof from the first elastic modulus to the second elastic modulus. A further additional and/or alternative characterization includes that the gradient of the layer 104 increases continuously (i.e., not discretely) through the thickness thereof from the first elastic modulus to the second elastic modulus. A further additional and/or alternative characterization includes that the gradient of the layer 104 increases substantially linearly through the thickness thereof from the first elastic modulus to the second elastic modulus. A still further additional and/or alternative characterization includes that the gradient of the layer 104 increases discretely (at least along portions thereof) through the thickness thereof from the first elastic modulus to the second elastic modulus. A still further additional and/or alternative characterization includes that the gradient of the layer 104 increases at a constant rate along the thickness of the layer 104 or may occur at an inconstant rate along the thickness of the layer 104, as long as the overall trend of the gradient increases along the thickness.

With reference to FIG. 3, the layer 104 may be formed via a single layer of material. For example, with reference to FIG. 4 a schematic view of the substrate 102 is shown being subject to a coating process in order to form at least one layer 104 thereon and to alter the elastic modulus and one or more functional properties of the resulting structure 100. The specific mechanisms for achieving the coating process, the available variables in the manufacturing process, and the structural details of the resultant combination 100 will be discussed in more detail later herein. By way of example, the single layer 104 of material may be formed in a process in which one application of material is deposited, resulting in one integrated layer 104 of material, or alternatively the layer 104 may be formed in a process in which multiple applications of material are provided, which nevertheless result in one integrated layer 104 of material, as opposed to discrete layers of material.

Figure 4:
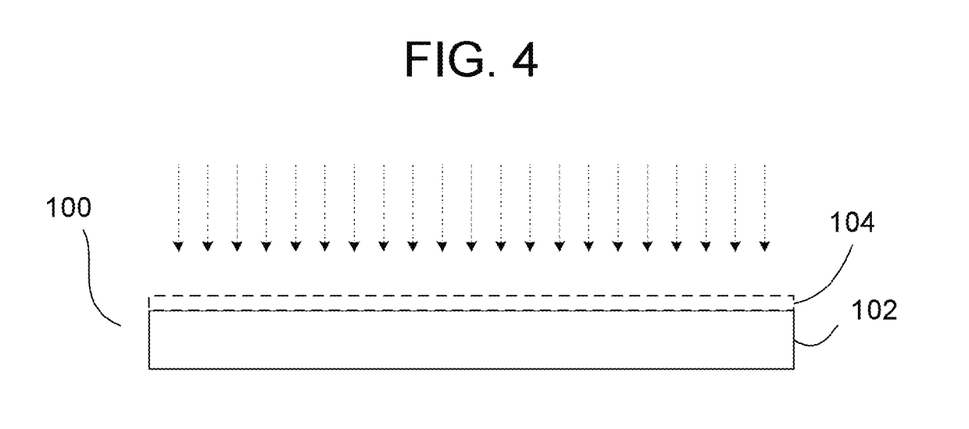
FIG. 4 is a schematic view of the glass substrate being subject to a coating process in order to form at least one layer thereon.
Figure 5:
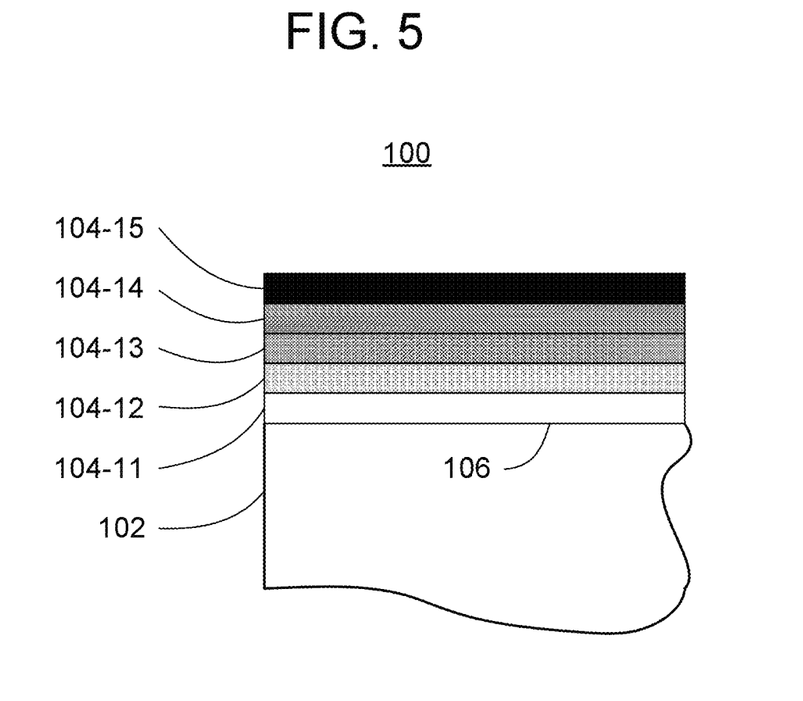
FIG. 5 is a schematic, side view of an alternative embodiment of the coated glass substrate of FIG. 1 taken through cross-sectional line 2-2.

Alternatively, with reference to FIG. 5, the layer 104 may be formed via a plurality of discrete sub-layers 104-11, 104-12, 104-13, 104-14, 104-15, etc. of material, one atop the other. One or more of the sub-layers 104-i may have specific chemical compositions, specific elastic moduli, specific hardnesses, specific layer thicknesses, and/or particular layer ordering to achieve desirable results. Again, with reference to the schematic illustration of FIG. 4, those skilled in the art will appreciate from the disclosure herein that the details presented will readily enable a skilled artisan to employ one or more methodologies for manufacturing such discrete sub-layers 104-i by applying well-known layering techniques to the situation.

The respective layers 104-11, 104-12, 104-13, 104-14, 104-15, etc. of material are illustrated as having differing visual density in order to communicate that each layer, respective groups of layers, etc., may have differing mechanical properties. For example, at least some adjacent layers of the plurality of discrete sub-layers 104-i of material may have differing elastic moduli. For example, the elastic modulus of layer 104-11 may differ from (e.g., be lower than) the elastic modulus of layer 104-12. Further, the elastic modulus of layer 104-12 may differ from (e.g., be lower than) the elastic modulus of layer 104-13. Still further, the elastic modulus of layer 104-13 may differ from (e.g., be lower than) the elastic modulus of layer 104-14. Still further, the elastic modulus of layer 104-14 may differ from (e.g., be lower than) the elastic modulus of layer 104-15.

Although the above embodiment has assumed that each layer 104-i exhibited a differing elastic modulus as compared with immediately adjacent layers, alternative embodiments will be evident to the skilled artisan. For example, a group of two or more layers 104-i may have the same or at least very similar characteristics, followed by another group of two or more layers 104-i may have the same or at least very similar characteristics, etc., so long as the net effect through the entire thickness of the composite layer 104 is the desired elastic modulus gradient. In this regard, many alternative combinations of material characteristics may be exhibited by the collection of discrete sub-layers 104-i, such as those discussed above and still further alternatives, such as a monotonic increase (albeit in discrete steps) in the elastic modulus from layer 104-11 through layer 104-15, and/or lesser or further layers. A further alternative includes the case where one or more of the discrete sub-layers 104-i in a generally increasing gradient (from layer 104-11 et seq. through subsequent layers) exhibit temporary lower elastic modulus than one or more previous layers, followed by a resumed increase in the gradient.

In keeping with at least some of the desired characteristics discussed in previous embodiments, the elastic modulus of layer 104-11 is lower or significantly lower than the elastic modulus of the substrate 102. Additionally or alternatively, the elastic modulus of one or more outer layers, e.g., at least layer 104-15 (and/or subsequent layers, if any, not shown) is higher than the elastic modulus of the substrate 102. Thus, at least in the aggregate, the elastic modulus gradient of the layer 104 increases discretely through the thickness thereof from the first elastic modulus to the second elastic modulus.

Layer Materials

The specific materials and/or compositions of the layer 104 include, for example, transparent conductive oxides, such as indium-tin-oxide (ITO), aluminum doped zinc oxides, gallium doped zinc oxides, and fluorine doped tin oxide; diamond-like carbon, $Al_2O_3$, AlON, TiN, TiC); infra red (IR) reflecting layers; ultra-violet (UV) reflecting layers; anti-reflection (AR) films, such as $SiO_2$, and $TiO_2$ layers; conductive layers; semiconducting layers, such as silicon and germanium; electronic layers, such as thin-film-transistor (TFT) layers. Additional and/or alternative materials include oxides, such as $SiO_2$, $Al_2O_3$, $TiO_2$, $Nb_2O_5$, $Ta_2O_5$; oxynitrides, such as $SiO_xN_y$, $SiAl_xO_yN_z$, and $AlO_xN_y$; nitrides, such as $SiN_x$, $AlN_x$, and $TiN_x$; highly siliceous polymers, such as highly cured siloxanes and silsesquioxanes; and/or selected metal films.

In some embodiments it may be advantageous to include a material in the layer 104 that has a refractive index that is similar to the refractive index of either the substrate 102, and/or other coatings or layers in order to minimize optical interference effects. In other embodiments, it may be advantageous to include a material in the layer 104 that has a refractive index (real and/or imaginary components) that is tuned to achieve anti-reflective interference effects. In other embodiments, it may be advantageous to include a material in the layer 104 that has a refractive index (real and/or imaginary components) that is tuned to achieve wavelength-selective reflective or wavelength-selective absorptive effects, such as to achieve UV or IR blocking or reflection, or to achieve coloring/tinting effects. In one or more embodiments, the layer 104 may have a refractive index that is greater than the refractive index of the substrate 102. For example, the layer 104 may have a refractive index in the range from about 1.7 to about 2.2, or in the range from about 1.4 to about 1.6, or in the range from about 1.6 to about 1.9.

The material of the layer 104 may also serve multiple functions, or be integrated with coatings or layers that serve other functions than the aforementioned functions of the layer 104. The layer 104 may include UV or IR light reflecting or absorbing layers, anti-reflection layers, anti-glare layers, dirt-resistant layers, self-cleaning layers, scratch-resistant layers, barrier layers, passivation layers, hermetic layers, diffusion-blocking layers, fingerprint-resistant layers, and the like. Further, the coating may include conducting or semi-conducting layers, thin coating transistor layers, EMI shielding layers, breakage sensors, alarm sensors, electrochromic materials, photochromic materials, touch sensing layers, or information display layers. The layer 104 may include colorants or tint. When information display layers are integrated into the glass-coating laminate, the glass-coating laminate may form part of a touch-sensitive display, a transparent display, or a heads-up display. It may be desirable that the coating performs an interference function, which selectively transmits, reflects, or absorbs different wavelengths or colors of light. For example, the coatings may selectively reflect a targeted wavelength in a heads-up display application.

Functional properties of the layer 104 may include optical properties, electrical properties and/or mechanical properties, such as hardness, modulus, strain-to-failure, abrasion resistance, mechanical durability, coefficient of friction, electrical conductivity, electrical resistivity, electron mobility, electron or hole carrier doping, optical refractive index, density, opacity, transparency, reflectivity, absorptivity, transmissivity and the like. These functional properties are substantially maintained or even improved after the coating is combined with the substrate 102.

Substrate Material and Characteristics

In the illustrated examples, the substrate 102 is substantially planar, although other embodiments may employ a curved or otherwise shaped or sculpted substrate 102. Additionally or alternatively, the thickness of the substrate 102 may vary, for aesthetic and/or functional reasons, such as employing a higher thickness at edges of the substrate 102 as compared with more central regions.

The substrate 102 may be formed of any suitable material, such as from at least one of quartz, glass, glass-ceramic, oxide glass, ion exchanged glass, combinations thereof, or other material(s).

When the substrate 102 is formed of glass or glass ceramic materials, then any suitable glass composition may be employed, such as soda lime glass ($SiO_2$, $Na_2O$, CaO, etc.), metallic alloy glasses, ionic melt glass, etc.

Ion Exchange Glass

In applications where the substrate 102 should exhibit high strength, the strength of conventional glass may be enhanced by chemical strengthening (ion exchange). Ion exchange (IX) techniques can produce high levels of compressive stress in the treated glass, as high as about 400 to 1000 MPa at the surface, and is suitable for very thin glass. One such IX glass is Corning Gorilla® Glass available from Corning Incorporated.

Ion exchange is carried out by immersion of a glass sheet into a molten salt bath for a predetermined period of time, where ions within the glass sheet at or near the surface thereof are exchanged for larger metal ions, for example, from the salt bath. By way of example, the molten salt bath may include $KNO_3$, the temperature of the molten salt bath may within the range of about 400-500° C., and the predetermined time period may be within the range of about 2-24 hours, and more specifically between about 2-10 hours. The incorporation of the larger ions into the glass strengthens the sheet by creating a compressive stress in a near surface region. A corresponding tensile stress is induced within a central region of the glass sheet to balance the compressive stress. Sodium ions within the glass sheet may be replaced by potassium ions from the molten salt bath, though other alkali metal ions having a larger atomic radius, such as rubidium or cesium, may replace smaller alkali metal ions in the glass. According to particular embodiments, alkali metal ions in the glass sheet may be replaced by Ag+ ions. Similarly, other alkali metal salts such as, but not limited to, sulfates, halides, and the like may be used in the ion exchange process.

The replacement of smaller ions by larger ions at a temperature below that at which the glass network can relax produces a distribution of ions across the surface of the glass sheet that results in a stress profile. The larger volume of the incoming ion produces a compressive stress (CS) on the surface and tension (central tension, or CT) in the center region of the glass. The compressive stress is related to the central tension by the following relationship:

$$CS = CT\left(\frac{t - 2DOL}{DOL}\right)$$

where t is the total thickness of the glass sheet and DOL is the depth of exchange, also referred to as depth of compressive layer. The depth of compressive layer will in some cases be greater than about 15 microns, and in some cases greater than 20 microns, to give the highest protection against surface damage.

Any number of specific glass compositions may be employed in producing the glass sheet. For example, ion-exchangeable glasses that are suitable for use in the embodiments herein include alkali aluminosilicate glasses or alkali aluminoborosilicate glasses, though other glass compositions are contemplated. As used herein, "ion exchangeable" means that a glass is capable of exchanging cations located at or near the surface of the glass with cations of the same valence that are either larger or smaller in size.

Process Considerations

Although some general process considerations were discussed above with respect to the coating of the layer 104 onto the substrate 102, some further details are now provided. In this regard, reference is again made to FIG. 4, which is a highly schematic representation of the process for coating the layer 104 on the substrate 102. Skilled artisans will appreciate that the mechanical properties of a coating (such as the layer 104) are closely related to the material composition, processing condition and material structures. Therefore, various techniques and methods are available to the artisan to achieve the aforementioned elastic (and/or hardness) gradient characteristics. Among the techniques available to the artisan is to control the deposition processing conditions, such as temperature, cooling profile, etc., to adjust residual stress and materials structure to reach a particular modulus (or hardness) gradient.

Another technique is to utilize a deposition method, such as atomic layer deposition (ALD) to deposit monolayer materials of differing elastic modulus (and/or hardness) to achieve the desired gradient. Atomic layer deposition (ALD) has emerged as a useful technique for depositing thin films for a variety of applications. Although semiconductor processing has been one of the main applications for the recent developments in ALD processing, the conformality capabilities achieved by ALD on high aspect structures has applicability to the instant application. Indeed, most ALD processes are based on binary reaction sequences where two surface reactions occur and deposit a binary compound film. As there are only a finite number of surface sites, the reactions are limited to depositing a finite number of surface species. If each of the two surface reactions is self-limiting, then the two reactions may proceed in a sequential fashion to deposit a thin film with atomic level control. Thus, in connection with the instant situation whereby the layer 104 (having the aforementioned gradient) is to be applied to the substrate 102, the advantages of the ALD process include: (i) precise thickness control at the Angstrom or monolayer level; and (ii) excellent step coverage and conformal deposition on high aspect ratio structures.

Those skilled in the art will appreciate, however, that the particular mechanism by which the layers 104 are applied is not strictly limited to the aforementioned techniques, but rather may be selected by the artisan in order to address the exigencies of a particular product application or manufacturing goal.

Thickness of the Layer

In most cases, the layer 104 is relatively thin, e.g., the layer 104 will generally have a thickness within some range. For example, contemplated thickness ranges include at least one of: (i) between about 10-200 nm; (ii) between about 20-100 nm; and (iii) between about 30-90 nm. Such ranges may be suited for a particular functional property, for example, the application of a layer 104 for thin film transistor applications. Still further contemplated thickness ranges include at least one of: (i) between about 50-10,000 nm; (ii) between about 500-10,000 nm; and (iii) between about 1000-2000 nm. By way of example, such ranges may be suited for the application of a layer 104 for scratch resistance properties. In general, the higher thicknesses may be possible owing to the higher resultant elastic modulus (and/or hardness) characteristics; however, there is a cost in manufacturability.

Elastic Modulus and/or Hardness of the Layer

As has been made clear in the above discussions, the respective elastic moduli of the layer 104 as compared with the substrate 102, and the gradient are important considerations in the production of the structure 100. In this regard, there are a number of options for characterizing these features of the structure 100.

For example, the first elastic modulus of the layer 104 (e.g., the modulus at or near the first surface of the layer 104 at the interface 106) may be one of: (i) about 1-85% lower than the elastic modulus of the substrate 102; (ii) about 5-70% lower than the elastic modulus of the substrate 102; and (iii) about 10-30% lower than the elastic modulus of the substrate 102. Put another way, the first elastic modulus of the layer 104 may be one of: (i) about 1-60 GPa lower than the elastic modulus of the substrate 102; (ii) about 3-50 GPa lower than the elastic modulus of the substrate 102; and (iii) about 7-20 GPa lower than the elastic modulus of the substrate 102. To put the above in further context, when the substrate 102 is formed from ion exchanged glass, such as Gorilla® Glass from Corning Incorporated, the elastic modulus of the substrate 102 is about 70 GPa. Thus, the elastic modulus of the layer 104 at or near the interface 106 of the substrate 102 may be one of: (i) about 5-69 GPa; (ii) about 35-67 GPa; and (iii) about 64-66 GPa.

Further, another option for characterizing the modulus of the layer 104 is to say that the second elastic modulus of the layer 104 (e.g., at or near the second surface 104-2) is one of: (i) at least about 25% higher than the elastic modulus of the substrate 102; (ii) between about 50-200% higher than the elastic modulus of the substrate 102; (iii) about 100% higher than the elastic modulus of the substrate 102; and (iv) at least about 200% higher than the elastic modulus of the substrate 102. Put another way, the second elastic modulus of the layer 104 may be one of: (i) at least about 15-20 GPa higher than the elastic modulus of the substrate 102; (ii) between about 20-70 GPa higher than the elastic modulus of the substrate 102; (iii) about 70 GPa higher than the elastic modulus of the substrate 102; and (iv) at least about 140 GPa higher than the elastic modulus of the substrate 102. To put the above in further context, when the substrate 102 is formed from ion exchanged glass (e.g., with an elastic modulus of about 70 GPa), the second elastic modulus of the layer 104 at or near the second surface 104-2 may be one of: (i) at least about 15-20 GPa above 70 GPa (or at least 85 GPa); (ii) at least about 20-70 GPa above 70 GPa (or at least 90 GPa); and (iii) at least about 70 GPa above 70 GPa (or at least 140 GPa).

Still further, another option for characterizing the modulus of the layer 104 is to say that a magnitude of the difference between the first and second elastic moduli of the layer 104 is one of: (i) at least about 25%; (ii) at least about 50%; (iii) at least about 100%; and (iii) at least about 200%. Put another way, the magnitude of the difference between the first and second elastic moduli of the layer 104 is one of: (i) at least about 15-20 GPa; (ii) at least about 30-40 GPa; (iii) at least about 50-60 GPa; and (iii) at least about 70 GPa.

As discussed infra, skilled artisans may also characterize the other functional properties described herein (e.g., hardness, refractive index and the like) of the layer 104 in a manner that parallels the above discussion of elastic modulus.

In one or more embodiments, the layer 104 increases the fracture strength of the structure 100, when compared to structures that include a layer without an elastic modulus gradient, as described herein. In one or more embodiments, the layer 104 prevents degradation of the fracture strength of the substrate 102, when compared to structures that include a layer without an elastic modulus gradient, as described herein. The layer 104 may prevent cracks in the layer 104 from bridging into the substrate 102.

EXAMPLES

A number of samples of structures adhering to the general characteristics of structure 100 were evaluated. In this regard, a number of substrates 102 formed from ion exchanged, Gorilla® Glass from Corning Incorporated were subjected to fracture strength tests using the known ring-on-ring test parameters. Some of the substrates 102 were uncoated and others were coated with 30-85 nm of ITO.

Figure 6:
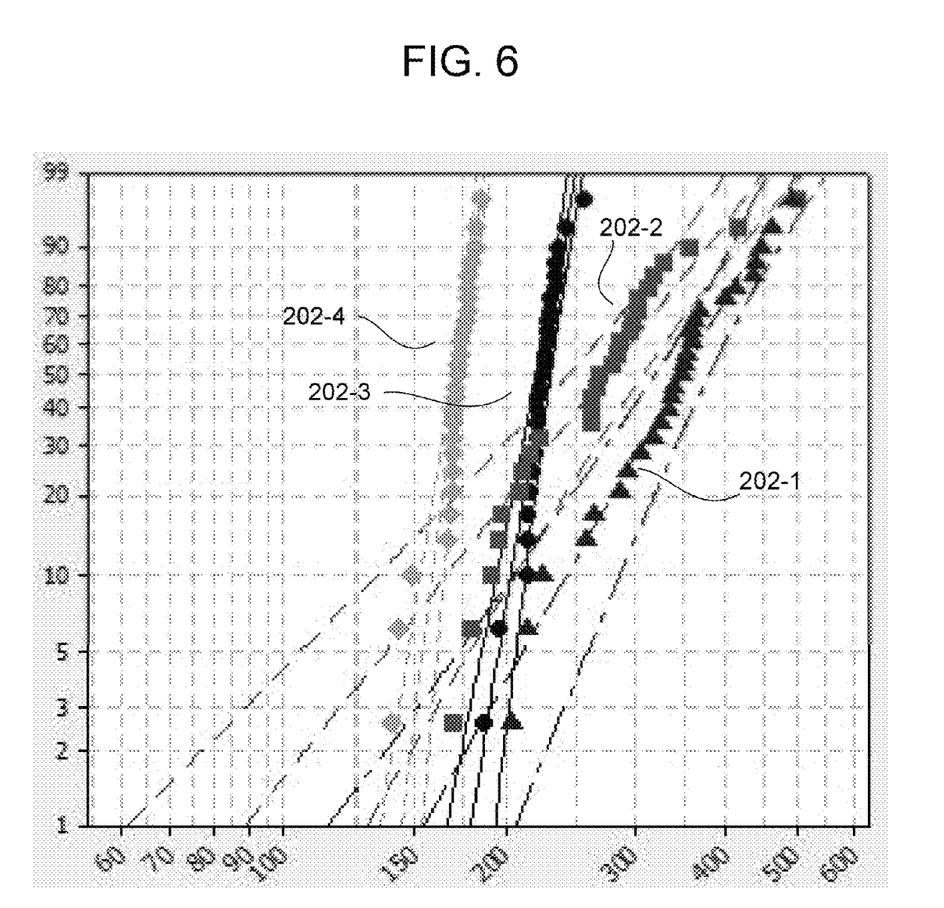
FIG. 6 is a graphical representation of the fracture strength of a number of substrates, both coated and non-coated, illustrating the effect of such coating.

FIG. 6 is a graphical representation of the fracture strength of a number of substrates, both coated and non-coated, illustrating the effect of such coating. With reference to FIG. 6, the ordinate (Y-axis) represents the probability of failure under Ring-on-Ring tests (in percent) and the abscissa (X-axis) represents the load applied in the Ring-on-Ring tests (in kgf), each axis being on a logarithmic plot. The substrates 102 providing the fracture strength data plots labeled 202-1 and 202-2 were uncoated, whilst the substrates 102 providing the fracture strength data plots labeled 202-3 and 202-4 were coated with 30 nm ITO and 85 nm ITO, respectively. Clearly, the reduction in fracture strength is significant.

In accordance with one or more embodiments herein, however, the addition of an elastic modulus gradient within the layer 104 would result in substantially maintaining the fracture strength of the substrate 102 even as one or more functional properties (e.g., scratch resistance) is significantly improved.

Although the disclosure herein has been described with reference to particular embodiments, it is to be understood that these embodiments are merely illustrative of the principles and applications of the embodiments herein. It is therefore to be understood that numerous modifications may be made to the illustrative embodiments and that other arrangements may be devised without departing from the spirit and scope of the present application.

The invention claimed is:

1. An apparatus, comprising:
   a substrate having first and second opposing surfaces, and an elastic modulus; and
   at least one layer having a thickness between first and second opposing surfaces thereof, where the first surface of the layer contacts the second surface of the substrate thereby forming an interface,
   wherein: (i) the layer exhibits a first elastic modulus proximate to the first surface thereof and a second elastic modulus proximate to the second surface thereof, (ii) the second elastic modulus is higher than the first elastic modulus, (iii) the first elastic modulus is lower than the elastic modulus of the substrate, (iv) the second elastic modulus is higher than the elastic modulus of the substrate, and (v) the layer exhibits an increasing elastic modulus gradient through the thickness thereof from the first elastic modulus to the second elastic modulus.

2. The apparatus of claim 1, wherein the elastic modulus gradient of the at least one layer increases monotonically through the thickness thereof from the first elastic modulus to the second elastic modulus.

3. The apparatus of claim 2, wherein the layer is formed from a single layer of material.

4. The apparatus of claim 2, wherein the layer is formed from a plurality of discrete sub-layers of material, one atop the other.

5. The apparatus of claim 4, wherein each of the plurality of discrete sub-layers of material have differing elastic moduli.

6. The apparatus of claim 1, wherein the elastic modulus gradient of the at least one layer increases discretely through the thickness thereof from the first elastic modulus to the second elastic modulus.

7. The apparatus of claim 1, wherein the first elastic modulus of the layer is one of: (i) about 1-85% lower than the elastic modulus of the substrate; (ii) about 5-70% lower than the elastic modulus of the substrate; and (iii) about 10%-30% lower than the elastic modulus of the substrate.

8. The apparatus of claim 1, wherein the first elastic modulus of the layer is one of: (i) about 1-60 GPa lower than the elastic modulus of the substrate; (ii) about 3-50 GPa lower than the elastic modulus of the substrate; and (iii) about 7-20 GPa lower than the elastic modulus of the substrate.

9. The apparatus of claim 1, wherein the second elastic modulus of the layer is one of: (i) at least about 25% higher than the elastic modulus of the substrate; (ii) between about 50-200% higher than the elastic modulus of the substrate; (iii) about 100% higher than the elastic modulus of the substrate; and (iv) at least about 200% higher than the elastic modulus of the substrate.

10. The apparatus of claim 1, wherein the second elastic modulus of the layer is one of: (i) at least about 15-20 GPa higher than the elastic modulus of the substrate; (ii) between about 20-70 GPa higher than the elastic modulus of the substrate; (iii) about 70 GPa higher than the elastic modulus of the substrate; and (iv) at least about 140 GPa higher than the elastic modulus of the substrate.

11. The apparatus of claim 1, wherein a magnitude of the difference between the first and second elastic moduli of the layer is one of: (i) at least about 25%; (ii) at least about 50%; (iii) at least about 100%; and (iii) at least about 200%.

12. The apparatus of claim 1, wherein a magnitude of the difference between the first and second elastic moduli of the layer is one of: (i) at least about 15-20 GPa; (ii) at least about 30-40 GPa; (iii) at least about 50-60 GPa; and (iii) at least about 70 GPa.

13. The apparatus of claim 1, wherein the substrate is formed from at least one of quartz, glass, glass-ceramic, oxide glass, ion exchanged glass, and combinations thereof.

14. The apparatus of claim 1, wherein the at least one layer is formed from an inorganic material.

15. The apparatus of claim 1, wherein the at least one layer is formed from at least one of: Indium-Tin-Oxide (ITO), aluminum doped zinc oxide, gallium doped zinc oxide, fluorine doped tin oxide, $Al_2O_3$, AlON, TiN, TiC, $SiO_2$, $TiO_2$, $Nb_2O_5$, $Ta_2O_5$, $SiO_xN_y$, $SiAl_xO_yN_z$, $AlO_xN_y$, $SiN_x$, $AlN_x$, and $TiN_x$, highly siliceous polymers, highly cured siloxane, highly cured silsesquioxanes, and metal film.

16. The apparatus of claim 1, wherein the thickness of the at least one layer is one of: (i) between about 50-10,000 nm; (ii) between about 500-10,000 nm; (iii) between about 1000-2000 nm; (iv) between about 10-200 nm; (v) between about 20-100nm; (vi) between about 30-90 nm.

17. An apparatus, comprising:
  a substrate formed from at least one of quartz, glass, glass-ceramic, oxide glass, ion exchanged glass, and combinations thereof, having first and second opposing surfaces, and an elastic modulus of between about 30-100 GPa; and
  at least one layer having a thickness between first and second opposing surfaces thereof, where the first surface of the layer contacts the second surface of the substrate thereby forming an interface,
  wherein: (i) the layer exhibits a first elastic modulus proximate to the first surface thereof and a second elastic modulus proximate to the second surface thereof, (ii) the first elastic modulus is at least between about 1-65 GPa lower than the elastic modulus of the substrate, and (iii) the layer exhibits an increasing elastic modulus gradient through the thickness thereof from the first elastic modulus to the second elastic modulus.

18. A method of making the apparatus of claim 1, by applying the one or more layers onto the substrate.

* * * * *